Figure 13:
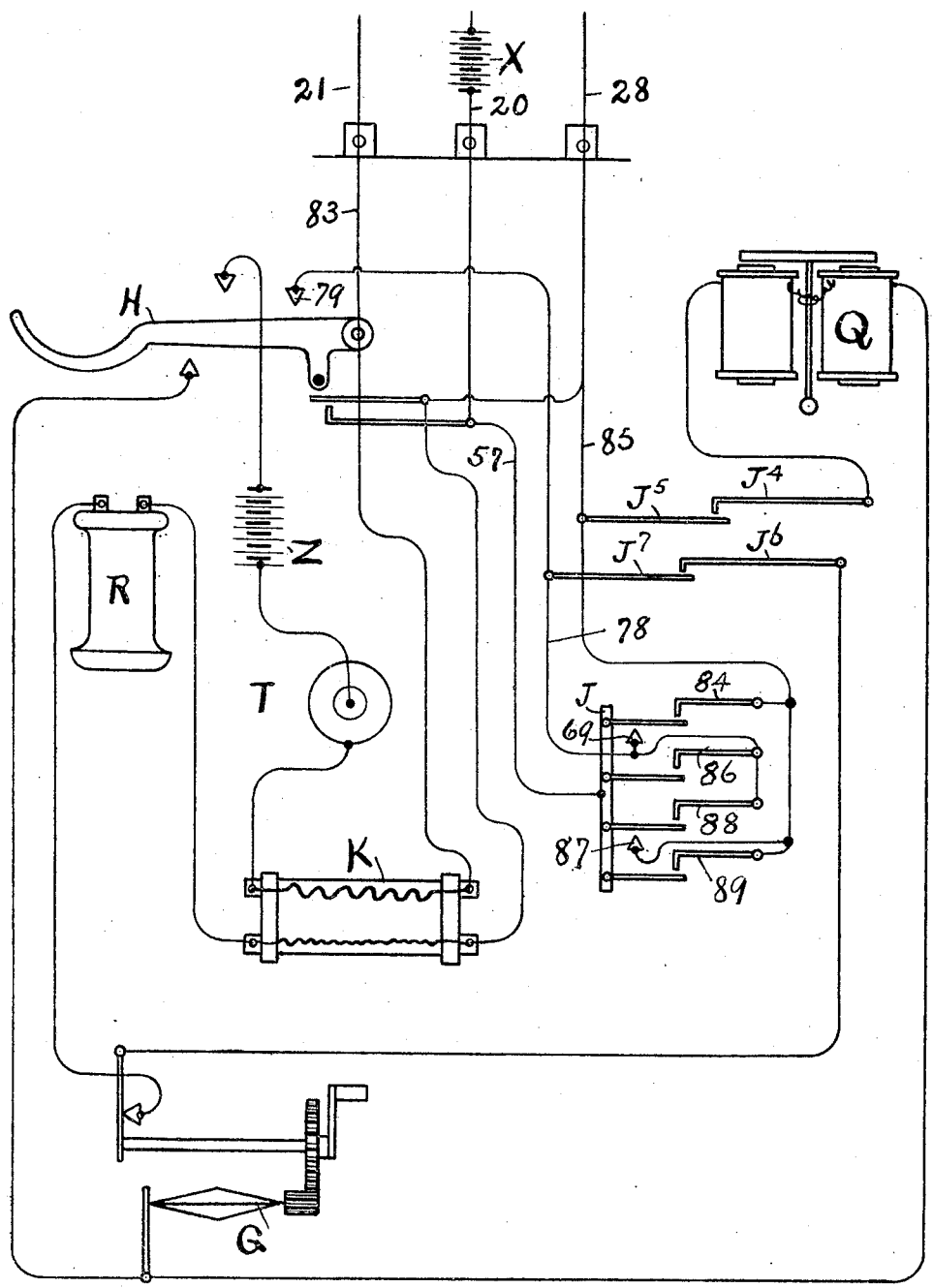

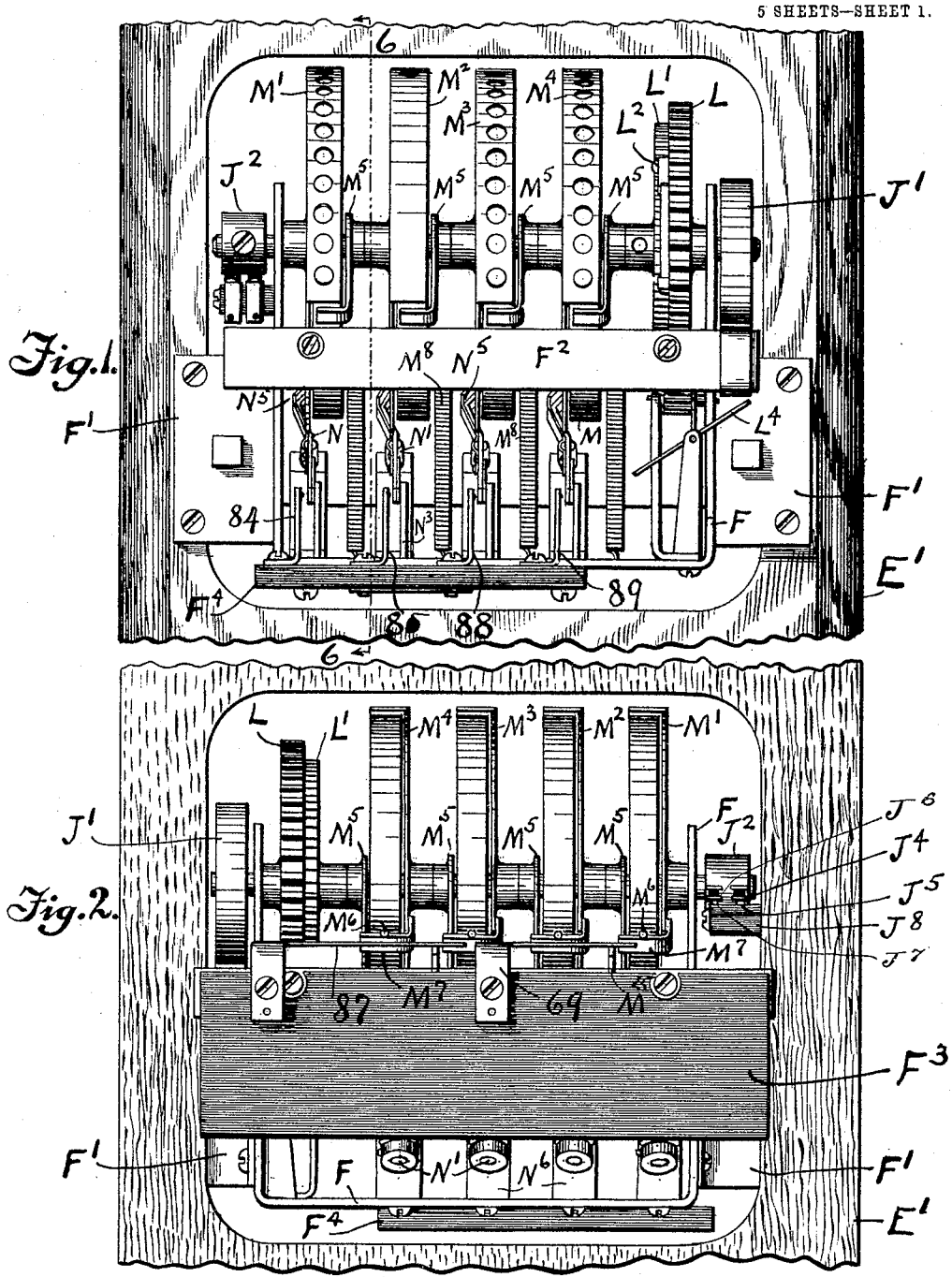

No. 799,346. PATENTED SEPT. 12, 1905.
F. A. LUNDQUIST & J. K. NORSTROM.
CALLING DEVICE FOR AUTOMATIC TELEPHONE EXCHANGES.
APPLICATION FILED AUG. 27, 1900.
5 SHEETS—SHEET 2.
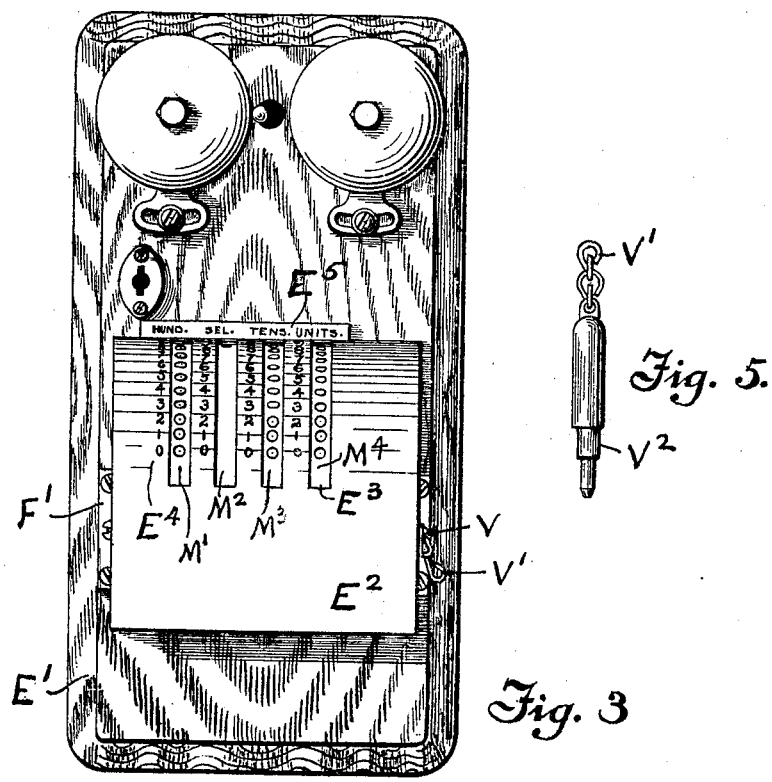
Fig. 5.
Fig. 3.
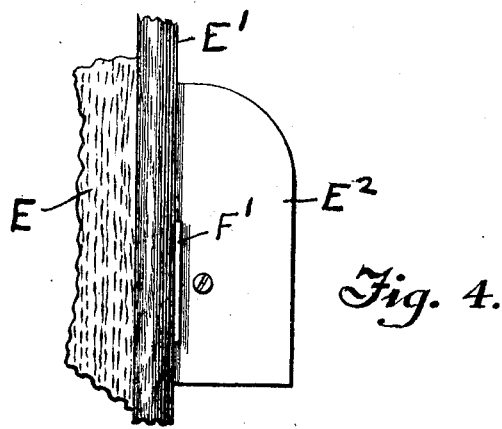
Fig. 4.
WITNESSES:
Howard A. Redfield
Carlos Escobar
INVENTORS
Frank A. Lundquist
John K. Norstrom
BY Casper L. Redfield
ATTORNEY.

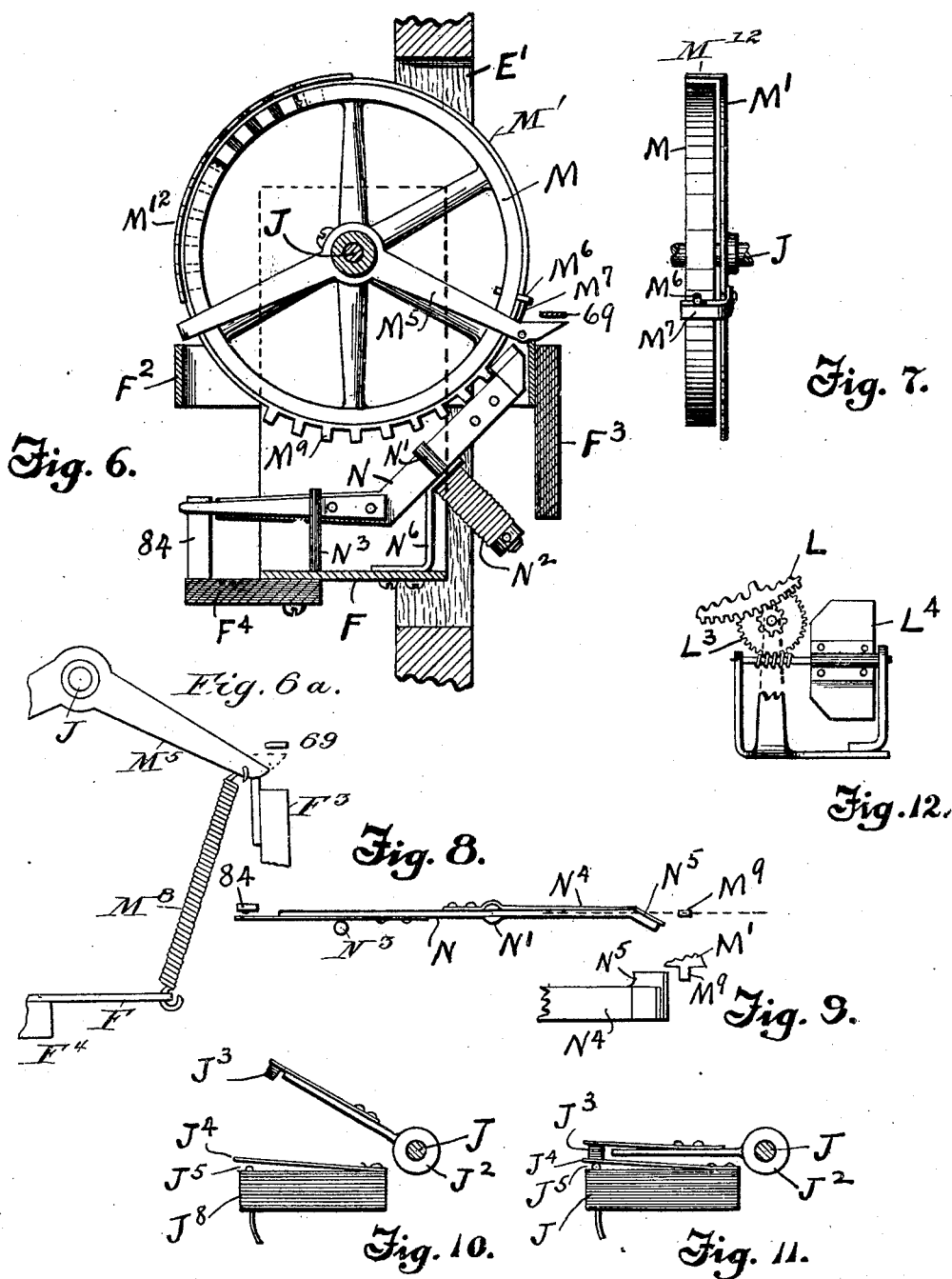

No. 799,346. PATENTED SEPT. 12, 1905.
F. A. LUNDQUIST & J. K. NORSTROM.
CALLING DEVICE FOR AUTOMATIC TELEPHONE EXCHANGES.
APPLICATION FILED AUG. 27, 1900.

5 SHEETS—SHEET 4.

WITNESSES:
Howard A. Redfield
Carlos Escobar

INVENTORS
Frank A. Lundquist
John K. Norstrom
BY Casper L. Redfield
ATTORNEY.

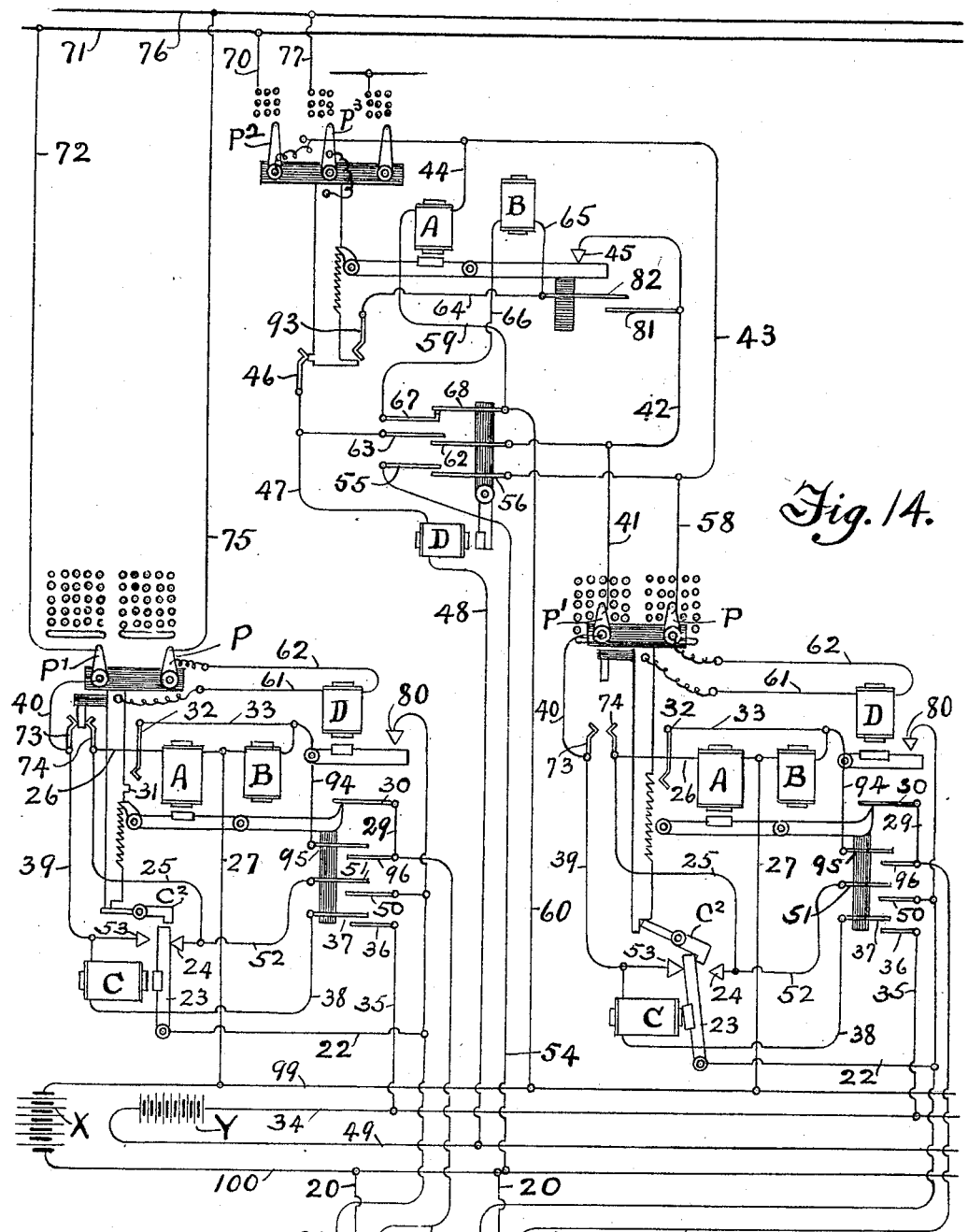

UNITED STATES PATENT OFFICE.

FRANK A. LUNDQUIST AND JOHN K. NORSTROM, OF CHICAGO, ILLINOIS, ASSIGNORS TO M. E. RICHARDSON, TRUSTEE, OF STERLING, KANSAS.

CALLING DEVICE FOR AUTOMATIC TELEPHONE-EXCHANGES.

No. 799,346. Specification of Letters Patent. Patented Sept. 12, 1905.

Application filed August 27, 1900. Serial No. 28,104.

*To all whom it may concern:*

Be it known that we, FRANK A. LUNDQUIST and JOHN K. NORSTROM, citizens of the United States of America, and residents of Chicago, county of Cook, and State of Illinois, have invented certain new and useful Improvements in Calling Devices for Automatic Telephone-Exchanges, of which the following is a specification.

Our invention relates to calling devices for automatic telephone-exchanges, and has for its object the construction of a device by which a complicated series of electrical contacts may be made conveniently and without danger of error.

In the accompanying drawings, Figure 1 is a front elevation of the mechanism secured to the cover of a telephone-box and with the inclosing shield removed. Fig. 2 is a rear elevation of the same mechanism. Fig. 3 is a front elevation of the telephone-box. Fig. 4 is a partial side elevation of Fig. 3. Fig. 5 is a detail of the plug or operating-pin. Fig. 6 is a section in line 6 6 of Fig. 1. Fig 6$^a$ is a partial view similar to Fig. 6. Fig. 7 is a rear elevation of part of the devices shown in Fig. 6. Fig. 8 is a plan of a contact-making lever shown in Fig. 6. Fig. 9 is a detail. Figs. 10 and 11 are details of contact-closing devices. Fig. 12 is a detail showing the governor. Fig. 13 is a diagram of the electrical connection in the telephone-box, and Fig. 14 is a diagram of the electrical connections to the switches which are to be operated by the calling device.

The diagram shown in Fig. 14 is substantially the same thing as a diagram shown in an application of F. A. Lundquist for an automatic telephone-exchange filed August 21, 1900, and given Serial No. 27,549. In that application the switches in the central office are divided into two classes, known, respectively, as "main" switches and "auxiliary" switches. There is a main switch at the central office for each telephone in the exchange and a small group of about ten auxiliary switches for each large group of from fifty to one hundred main switches. In operating an exchange of this character the subscriber at the telephone operates his calling device so as to move the main switch connected thereto to a series of contact-points in his switch which represents a certain group of auxiliary switches. He then moves his switch over this particular group, and when contact is made to an auxiliary switch which is unemployed his own switch automatically stops and the selected auxiliary switch is automatically moved so as to be isolated from connection by any other main switch. By further operating of his calling device he moves the selected auxiliary switch to connection with any required main switch, which puts him into communication with any other telephone in the exchange.

On the cover E' of the telephone-box E are two brackets F', which support a U-shaped frame F. Supported on the frame F is a shaft J, upon which are mounted a series of wheels M, which are rigidly secured to said shaft. At one end of the shaft J is a spring J', acting to hold said shaft at a normal position, and at the other end of the shaft is an arm J$^2$, provided with insulating-blocks J$^3$, which are adapted to come into contact with and close contact devices J$^4$ and J$^5$, and also J$^6$ and J$^7$, which are supported on an insulating-block J$^8$. These contact devices are closed when the shaft is at its normal position, but open when the shaft is moved. Loosely mounted on the shaft J and adjacent to the wheels M are a series of disks M', M$^2$, M$^3$, and M$^4$. Also adjacent to the wheels M and loosely mounted on the shaft J are a series of arms M$^5$, at the rear end of each of which is a spring M$^8$, acting to hold them against a frame F$^2$, secured to and supported on the frame F. Secured on the disks M', M$^2$, M$^3$, and M$^4$ are some projections M$^7$, that extend around the face of the wheels M. Over the levers or arms M$^5$ on each wheel there is a pin M$^6$, adapted to come in contact with the projection M$^7$. These parts are so arranged that the spring J' holds the pins M$^6$ against the projections M$^7$, which projections in turn rest on the levers M$^5$. If a wheel M be rotated in a forward direction, the pin M$^6$ will move away from the projection M$^7$ without disturbing the position of the disk M'. If, however, the disk M' be rotated in a forward direction, the engagement between M$^6$ and M$^7$ will also cause the rotation of the wheel M, and consequently the shaft J, against the action of the spring J'. As a consequence of this the wheel M may be moved forward without disturbing any disk, while the forward movement of any disk will cause the forward movement of the wheels without moving the other disks. On the upper front part of each one of the disks there is a flange $M^{12}$ projecting over the face of the adjacent wheel M, and through the flange and in the wheel are a series of holes adapted to receive a plug or pin $V^2$. (Shown in Fig. 5.)

Below the wheels M are a series of contact-making levers N, each one of which is pivoted on pin $N'$ and is normally held by a spring $N^2$ in contact with a pin $N^3$, supported on the frame F. The pin $N'$ is not supported directly from the frame F, but is mounted to turn in a bracket $N^6$, and the spring $N^2$ has one end secured to the bracket $N^6$. At the rear end of the lever N is a spring-piece $N^4$, which is bent to one side, as shown in Fig. 8, and which has an upward projection $N^5$. On each one of the disks are a series of teeth $M^9$, so located with respect to the projection $N^5$ that when the disk is rotated they engage said projection. When these teeth move in one direction, they vibrate the lever N and cause it to make electrical contacts with a contact-pin 84. When moving in the opposite direction, these teeth cause the spring-piece $N^4$ to move to one side without moving the lever N, and consequently without making electrical contact with 84. The line of movement is shown by the dotted line in Fig. 8. It will be evident that if the tooth $M^9$ (shown in Figs. 8 and 9) be moved toward the left it will engage the beveled projection $N^5$ and cause the opposite end of the lever N to strike the contact-pin 84. If, however, the movement of the teeth $M^9$ be in the opposite direction along the dotted line, they will strike the opposite face of the projection $N^5$, thus bending the spring $N^4$, the action of which is to press the lever N away from and not toward the contact-pin 84. The front end of the levers $M^5$ bend around in front of the wheels $M^3$ just a little above the frame $F^2$. At the rear of the device and secured to the frame $F^2$ is an insulating-plate $F^3$, and to this are secured two contact-springs 69 and 87. These contact-springs project transversely over the rear ends of the levers $M^5$, so that if the rear end of $M^5$ is raised it will make electrical contact with the spring-contact which is just above it. The spring-contact at 69 extends over two of the levers $M^5$, and the other spring-contact 87 extends over the other two levers. With our arrangement, however, part of the levers $M^5$ are cut off at the rear end, so that when moved they will not make electrical connection with the contact-spring over them. The part cut away is shown by dotted lines in Fig. 6ª. The ones that are cut off are determined by the particular series or manner in which the series of contacts are made. In the particular series of contacts which are described for the diagram in Fig. 14 the second and fourth levers $M^5$ do not make such contact.

Over the mechanism just described is a metallic shield or cover $E^2$, which is provided with a series of slots $E^3$, corresponding in position to the flanges in the disks $M'$, $M^2$, $M^3$, and $M^4$. Adjacent to the holes in said flanges and on the cover or shield $E^2$ are a series of figures $E^4$, which number the holes in the flanges on the disks. In the disks $M^2$ there is only one hole, which represents 10. On the other disks there are ten holes, one for each adjacent number. Secured to the cover $E^2$ is chain $V'$, on the end of which is a pin $V^2$, adapted to be inserted in the holes on the flanges of the disks. By inserting the pin $V^2$ in one of the holes in the disk $M'$ and moving it downward to the limit of its movement it will be in engagement with the front of the frame $F^2$ or the lower edge of the slot $E^3$ on the cover $E^2$. This action will rotate the disk $M'$, the shaft J, and the wheels M against the tension of the spring $J'$. By removing the pin, so as to release the wheel M, into which the said pin has been inserted through one of the holes in the flange $M^{12}$, the spring $J'$ will rotate the shaft, and consequently the disk $M'$, in the opposite direction back to its normal position. On the first movement of the wheel M the pin $V^2$ will strike the lever $M^5$ just before it is stopped at its extreme position, and such striking of the lever $M^5$ will cause it to make an electrical connection with the spring 69 at the rear. On the return movement the teeth $M^9$ will engage the projection $N^5$ on the lever N and cause it to be vibrated into the contact with the contact-point 84. There will be one such vibration for each tooth $M^9$. As these teeth are spaced to correspond with holes in the flanges of the disk $M'$, there will be as many contacts with 84 as there were holes moved downward. By inserting the pin $V^2$ into the hole marked 6 and moving the disk $M'$ to a stop there will be one contact made with the spring 69, and when the wheel is released by removing the pin there will be six contacts made with the contact 84. When the pin is inserted in the hole of the disk $M^2$ and moved down to a stop, there will be ten contacts made by the corresponding lever N. The other disks $M^3$ and $M^4$ will similarly have as many contacts made as will be indicated by those in which the plug $V^2$ is inserted. To prevent the spring $J'$ from moving the shaft J, so as to make the contacts too rapidly, there is a gear L loosely mounted on the shaft J, adjacent to which is a ratchet-wheel $L'$, which is arranged to engage a pawl $L^2$, secured to the gear L. From the gear L is a train of gearing $L^3$ to a fan $L^4$, which acts as a governor to prevent too rapid rotation. The ratchet-wheel $L'$ is secured to the shaft J, and when the shaft is moved forward the ratchet-wheel slides under the pawl $L^2$; but when the shaft is rotated in the opposite direction the said ratchet-wheel engages the said pawl and drives the gear L, and consequently the fan $L^4$.

Referring to the diagrams, when a contact is made at the telephone a current flows from the battery through line 20 into the telephone-station and out over line 21 or line 28, according to what contact is made. For convenience we have designated the current flowing out over the line 21 as being caused by a contact made by what may be called the "first contact." When it flows out through the line 28, there will be made what we have called the "second contact." The particular arrangement of switches shown in Fig. 14 calls for a series of contacts made in the following order:

{ 1st contact .... Once.
{ 2d contact..... Required number of times.
{ 1st contact ...... Ten times.
{ 2d contact..... Once.
{ 1st contact .... Required number of times.
2d contact....... Required number of times.

Where two contacts are bracketed together, they are made by a single operation by the pin $V^2$—that is, the first bracket included a contact made once by connection between the lever $M^5$ and the spring 69—and a required number of contacts made by teeth $M^9$ and are represented by the place in which the pin $V^2$ is inserted.

Assuming that a subscriber wishes to manipulate his calling device so as to put his telephone into electrical connection with telephone No. 625, he proceeds as follows: He would insert pin $V^2$ in the hole adjacent to 6 under the heading "Hund" and move it downward to the stop and then release. He would then insert the pin in the single hole under the heading "Sel" and similarly move it to the stop. He would then insert it in the hole 2 under "Tens" and afterward in the hole 5 under "Units," each time moving to the stop below. The first contact made would be that caused by the lever $M^5$ engaging the spring 69, so the current will flow from the battery at the central station as follows, reference being had to the diagrams in Figs. 13 and 14: X, 100, 20, 57, J, 69, 78, 79, (the hook H being up,) H, 83, 21, 22, 23, 24, 25, 26, A, 27, 99, X. This being made once moves his switch upward one step. The return of the disk M' will make six contacts between N and 84, and as N is in electrical connection with the base of the mechanism, and consequently the shaft J, there will be six electrical impulses as follows: X, 100, 20, 57, J, 84, 85, 28, 29, 30, base of switch, 31, 32, 33, B, 27, 99, X. This will move the switch laterally to the sixth row of contact-points. This lateral movement may be made in any convenient manner, as by ratchet-teeth on the bar carrying the contact-makers P and P'. In the present instance the magnet B for this purpose is alone shown, the mechanism involved not being a part of the present application. Inserting the pin in the disk $M^2$ and moving it to the lower extremity and then releasing will cause ten electrical connections between the lever N and the contact-point 86, which will send electrical impulses as follows: X, 100, 20, 57, J, 86, 78, 79, H, 83, 21, 22, 23, 24, 25, 26, A, 27, 99, X. This will move the switch upward, as before. When, however, the switch reaches contact-points which are in electrical connection with an unemployed auxiliary switch, then there will be impulses as follows: Y, 34, 35, 36, 37, 38, C, 39, 40, P', 41, 42, 45, base of auxiliary switch, 46, 47, D, 48, 49, Y. The current through the magnet C of the main switch breaks its own circuit at 23 24; but there is a shunt from 21 to 25 by the way of 50 51 52, which is closed by the action of the magnet A and holds its own circuit until the circuit is broken at the telephone-station. After the circuit is broken at the telephone-station it will be apparent that further contacts made by the lever N on the contact-point 86 will not move the switch upward. The current through the magnet D closes 55 56 when the current flows as follows: X, 100, 54, 55, 56, 43, 44, A, 59, 60, 99, X. This will move the auxiliary switch upward one step, breaking the connection between the base of the switch and the contact-spring 46, and as the current passes through the part 46 to move the switch in the manner just described it will be apparent that the said auxiliary switch will be isolated and cannot be reached by any other main switch in the same manner. Then inserting $V^2$ in the disk $M^3$ at the hole marked 2 and moving it downward until it is stopped, the lever $M^5$ will make one electrical connection with the contact-spring 87, and upon releasing the disk the return movement will make two electrical connections with the contact 88. When the contact is made at 87, a current will flow as follows: X, 100, 20, 57, J, 87, 85, 28, 29, 30, base, 61, D, 62, P, 58, 43, 44, A, 59, 60, 99, X. This moves the auxiliary switch up to connection with 93. Then when the two contacts with 88 are made the current flows as follows: X, 100, 20, 57, J, 88, 78, 79, H, 83, 21, 22, 23, 53, 39, 40, P', 41, 42, 45, base of switch, 93, 64, 65, B, 66, 67, 68, 60, 99, X. This moves the auxiliary switch laterally to the second row of contact-points. Inserting the pin $V^2$ at the hole 5 in the disk $M^4$ and moving it downward, as before, five electrical contacts are made with the contact 89, which being in electrical connection with the contact 87 the current flows as previously described and moves the auxiliary switch upward five steps.

What we claim is—

1. A series of indicators having a normal relationship to each other, means by which any one of said indicators may be independently moved any required distance from its normal relationship to the other indicators, and a spring common to all indicators and arranged to return the moved indicator to its original position with respect to the other indicators.

2. A series of disks each of which is provided with one or more holes, graduating-marks adjacent to said holes, means by which any one of said disks may be independently moved any required distance from its normal position, a series of teeth on each disk, means by which said teeth make a series of electrical contacts upon the return of a moved disk to its normal position, and a spring common to all disks and arranged to return the moved one to its normal position.

3. A series of indicators having a normal relationship to each other, means by which any one of said indicators may be independently moved any required distance from its normal position with respect to the other indicators, a motor mechanism common for all indicators and arranged to return the moved indicator to its original position with respect to the other indicators, and a governor for controlling the speed of said motor.

4. In a calling device for a telephone belonging to an automatic telephone-exchange, a series of indicators having a normal relationship to each other and independently movable therefrom, means by which any one of said indicators may be moved any distance from its normal position, a spring common to all indicators and arranged to return a moved indicator to its normal position with respect to the other indicators, and a contact-making device operated by the moved indicator.

5. A shaft, a series of indicators loosely mounted on said shaft, means whereby the manual movement of one of said indicators will also move said shaft, a spring arranged to return said shaft and the moved indicator to their normal positions, and means whereby the return movement of an indicator will make a series of electrical contacts.

6. A series of disks each of which is independently movable forward from and back to a normal position, a spring for making the return movement, means by which such return movement will make a series of electrical contacts, and independent means for making a different electrical contact by the forward movement.

7. In a telephone calling device, four independently-movable indicators, means by which each moved indicator will make a series of electrical contacts corresponding in number to the distance which it is moved, two circuits over which electrical impulses are sent by the making of such contacts, and connections from said circuits to said indicators so that upon manipulation of the four indicators in succession impulses will flow as follows: from the first indicator, one impulse over the first circuit and a required number over the second circuit; from the second indicator, an automatically-determined number over the first circuit; from the third indicator, one over the second circuit, and a required number over the first circuit; and from the fourth indicator, a required number over the second circuit.

Signed at Chicago, Illinois, this 2d day of August, 1900.

FRANK A. LUNDQUIST.
JOHN K. NORSTROM.

Witnesses:
LOUISE PETERSEN,
CASPER L. REDFIELD.